Jan. 3, 1928.

C. W. HOWLETT 1,654,880

AIR BAG INSERTING MACHINE

Filed Nov. 6, 1926

INVENTOR
CLARENCE W. HOWLETT

BY

ATTORNEY.

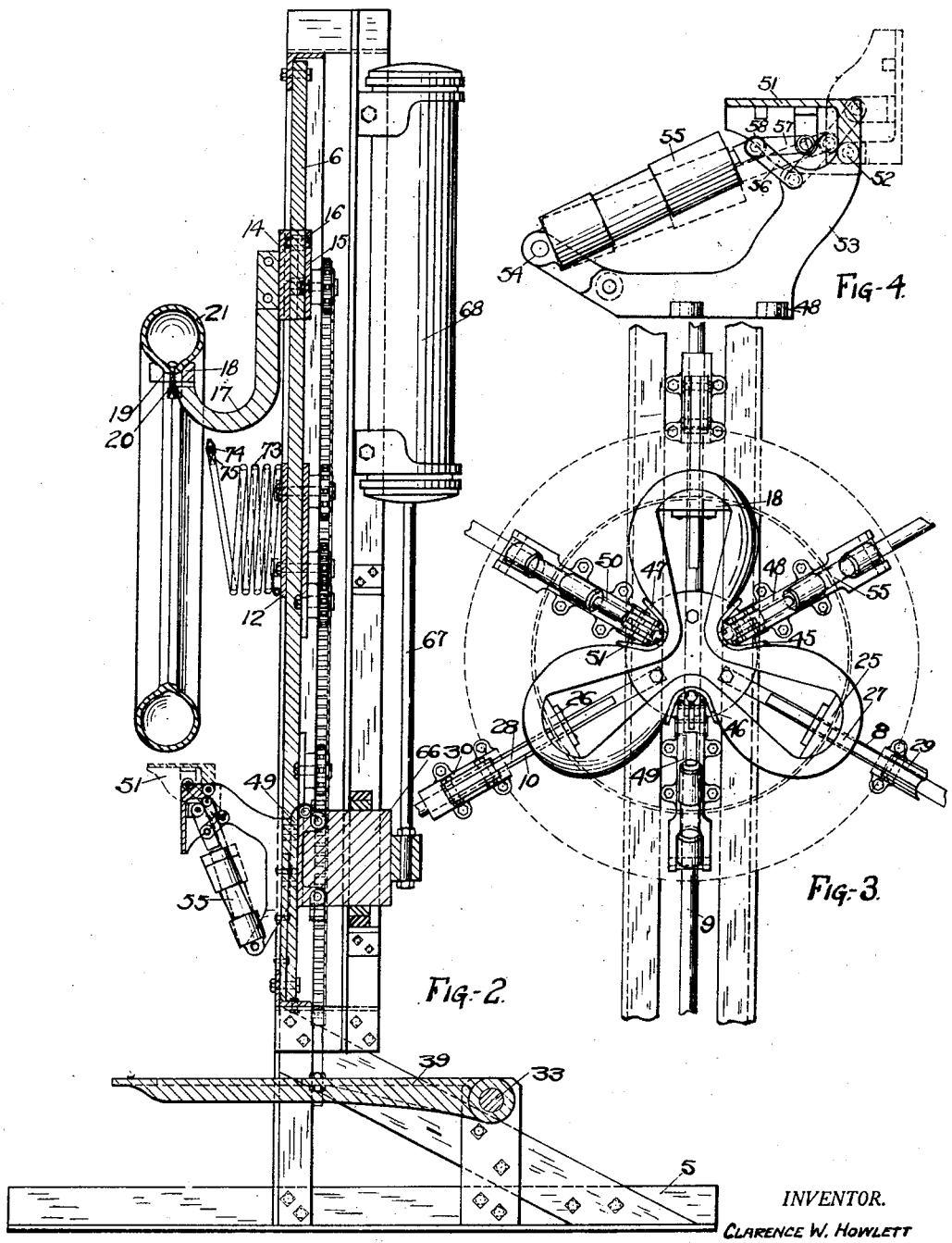

Patented Jan. 3, 1928.

1,654,880

UNITED STATES PATENT OFFICE.

CLARENCE W. HOWLETT, OF KOKOMO, INDIANA, ASSIGNOR TO THE AKRON STANDARD MOLD COMPANY, OF AKRON, OHIO, A CORPORATION OF OHIO.

AIR-BAG-INSERTING MACHINE.

Application filed November 6, 1926. Serial No. 146,608.

The present invention relates to the construction of pneumatic automobile tires by the air bag method which is well known in the art. Tires manufactured by this process have inserted within them heavy bags or cores of rubber or rubber and fabric.

Air bags have usually been inserted by hand in tires preparatory to vulcanization, and as the bag is heavy and stiff, the operation is attended with much labor and loss of time in the factory. Air bags which are difficult to collapse into the required position so as to be insertable within the tire, are often subjected to very severe handling and treatment which will cause premature failure of the air bag.

The object of the present invention is to construct a machine which will collapse air bags of all sizes and types quickly and easily and permit their insertion within the pneumatic tire. The release of the mechanism causes the bags to reassume their circular condition within the tire. The machine can also be used to assist in the seating of the bag within the tire casing by operation of certain elements of the machine at the time the air bag expands into the tire casing.

The machine is also provided with means to introduce air under pressure into the air bag while the tire and bag are in the machine, and thus may be used for shaping so-called "flat built" or " drum built" tires. The machine is arranged in a vertical plane with the operative elements spaced from the framework so that it is easy of access.

The ease of operation, economy of labor and saving of air bags are the principal advantages of the invention. Other advantages and beneficial results will be apparent to those skilled in this art, and while the drawings and description are quite specific to the detailed construction shown and described herein, such changes and modifications as fall within the scope of the invention are intended to be covered in the claims appended hereto.

In the drawings:

Figure 2 is a vertical section through the center of the machine;

Figure 3 is a front elevation showing the bag collapsed; and

Figure 4 is details of an outer shoe for collapsing the air bag.

Figure 1:
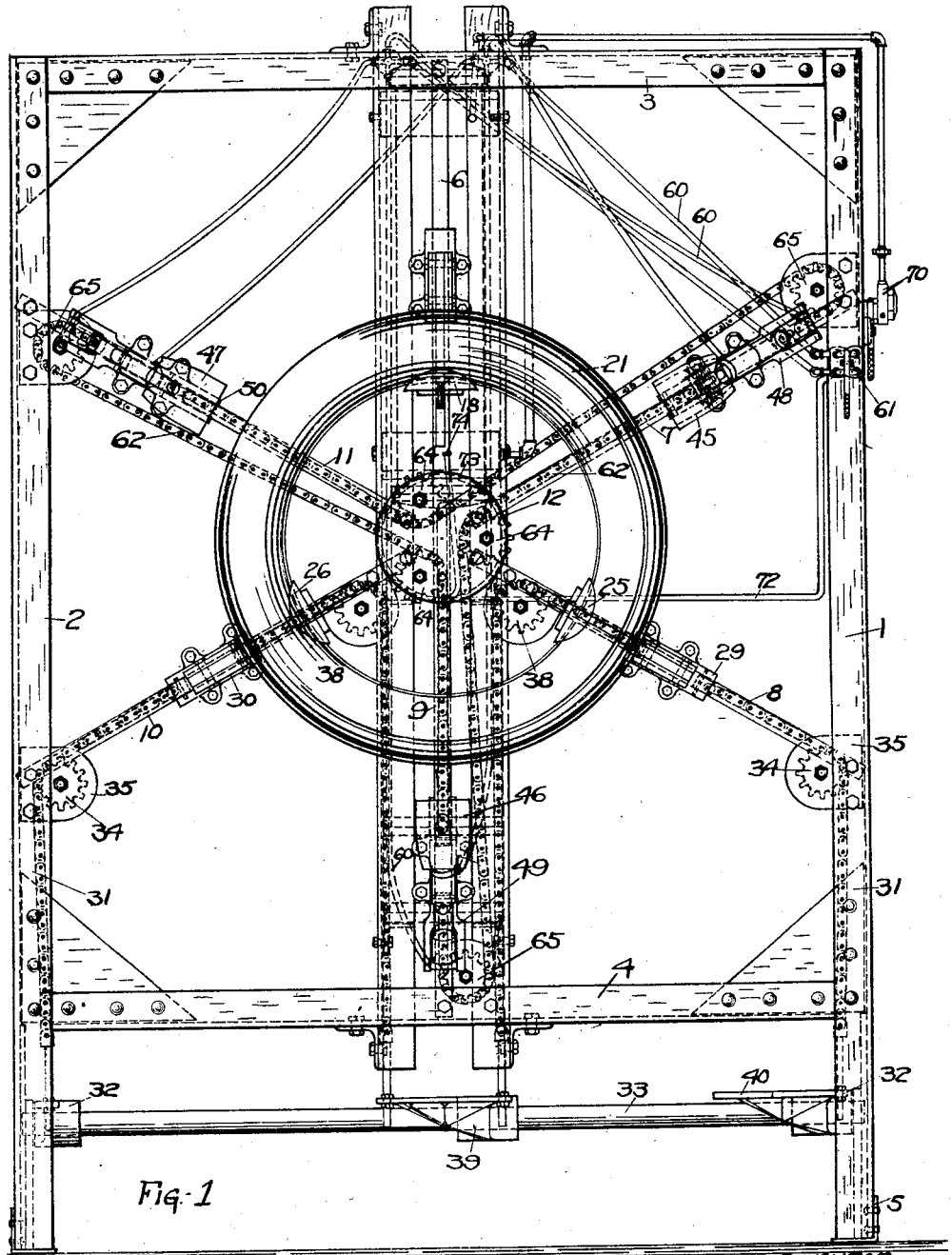
Figure 1 is a front elevation of the machine showing the air bag thereon in non-collapsed position.

The machine is constituted of a vertical rectangular framework comprising right and left uprights 1 and 2, respectively, and upper and lower cross-members 3 and 4 respectively. The machine is supported in base members 5, to which it is braced.

Attached to the members of the framework are six guide rails or bars, numbered 6 to 11 inclusive, these guide rails being spaced about the framework in equi-angular relation and being connected to a central supporting plate 12, the vertical bars 6 and 9 being continuous.

The air bag is supported and collapsed by means of six shoes spaced at 60° apart around the center of the machine and arranged in groups of three alternating about the machine, one set or group of shoes being relatively stationary to the other and being located about the inner periphery of the bag, the other set being movable toward and from the center of the machine and located about the outside of the bag. The upper-most shoe of the inner set is fixed upon the guide rod 6, being adjustable however, for the purpose of accommodating the machine to various sizes of air bags. This shoe comprises a plate or slide 14 which is clamped in the desired position upon the guide rail 6 by a plate 15 and bolts 16. To the front of the plate 14 is secured a depending, curved arm 17, to the end of which is attached the arched shoe 18. This shoe is provided with a slot 19, through which the valve stem 20 of the air bag 21 is passed.

The other shoes of the inner set are designated by the numerals 25 and 26. These shoes are supported upon the ends of curved arms 27 and 28 which are carried upon slide blocks 29 and 30, movable on the rails 8 and 10. The movement of these slide blocks is for two purposes. The first reason for moving the shoes is to enable them to be positioned inwardly so that the bag can be placed thereover and so that the shoes can move inwardly slightly as is necessitated by the collapsing of the bag. The shoes are also movable outwardly so that the bag can be forced into position by a series of blows delivered upon the inner circumference of the bag by the movement of the shoes after the bag has reassumed its circular condition.

Each slide 29 and 30 is attached to an individual chain 31, each chain being secured at one end to a bracket 32, these brackets being attached to a rock shaft 33 mounted in the lower portion of the framework. Each chain extends vertically from the bracket and passes over a sprocket 34 attached to a bracket 35 on the frame at the point where the guide rail 8 or 10 is secured to the side frame. The chain then passes along the rail 8 or 10, being attached to the slide, and over a sprocket 38 near the center of the machine. The two chains are attached at their other ends to a foot treadle 39 which rocks upon the shaft 33. The treadle 39 is at the center of the machine, and one of the brackets 32 at the side of the machine is provided with a second foot treadle 40. It will be observed that pressure applied to the treadle 39 will move the shoes 25 and 26 toward the center of the machine, and pressure applied to the treadle 40 will move them outwardly of the machine.

The shoes constituting the outer set of three are carried by the guide rails 7, 9 and 11, being alternated with the shoes 18, 25 and 26, and being on the outside of the bag. These shoes are indicated by the numerals 45, 46 and 47, being carried upon slides 48, 49 and 50, respectively, movable upon the guide rails 7, 9 and 11. These shoes being similar in construction, a description of one will suffice.

Each shoe has a substantially U-shaped member 51 which is pivoted at 52 in the end of an arm 53 extending from the slide. An arm 54 is also formed upon the slide, pivotally supporting the end of a small cylinder 55, the piston of which is connected to the knee of a toggle comprising pivoted links 56 and 57 connected to the arm 53 and the shoe. When the piston is moved outwardly, the shoes, which are in the dotted line position of Figure 4, will engage the outer surface of the bag, and when they are withdrawn to the full line position of Figure 4, the shoes will clear the tire and the air bag. The arrangement is preferably such that when the shoe is at its outer position, the toggle is moved slightly past center. Rubber bumpers 58 may be placed on the toggles to contact with the pivot 52 when the shoe is at its outermost point. Air is admitted to and released from the cylinders 55 through suitable flexible piping, indicated by the numeral 60 and controlled by a valve 61 at the side of the machine, thereby rocking the shoes upon their pivots, moving them simultaneously into and out of the plane of the bag.

The slides 48, 49 and 50 are all connected to an endless chain 62 which is looped about three sprockets 64 at the center of the machine and three sprockets 65 at the extremities of the guide rails 7, 9 and 11. The slide 49 is connected to a block 66 which is in turn connected to the piston 67 of a vertical cylinder 68 mounted on the back of the framework. Air to the cylinder is controlled by a valve 70 at the side of the frame. The parts are so connected that when the slide 49 is moved toward and from the center of the apparatus, the other slides move in unison therewith, and as a result, all of the shoes are moved at the same time toward or from the center of the machine.

An air line 72 leads to the center of the machine, the end thereof being connected to a coil of pipe 73 having a nozzle 74 which can be placed in communication with the valve stem of the air bag. A valve 75 at the nozzle controls the admission of air to the air bag.

The series of operations performed by the machine is as follows:

The various shoes being in the position shown in Figure 1, the air bag is placed over the shoes 18, 25 and 26, the last named shoes being withdrawn or advanced by the treadles 39 or 40 as may be necessary. Air is then admitted to the cylinders 55 by the valve 61 moving the shoes 51 to their outer position. The valve 70 is now operated, moving the block 66 and with it the slides carrying the shoes 51. The inward movement of these shoes distorts the bag to the position shown in Figure 3, the shoes 25 and 26 moving inwardly as may be necessary. The tire casing to be bagged is then placed about the collapsed air bag, and the air released from the cylinders 55 which causes the shoes to fly back to their retracted position, the resilience of the bag causing it to spring outwardly within the casing. Operation of the cylinder 68 moves all of the slides outwardly to their former positions, the shoes clearing the tire. The operator then tramps upon the treadle 40 and the shoes 25 and 26 are moved outwardly, forcing the bag outwardly to its final position. This operation may be repeated a number of times, causing a tamping action. At the same time air may be admitted to the bag through the nozzle 74 and the valve stem, causing the bag to round out properly within the tire. The tire with the air bag within it is then lifted off the machine after the shoes 25 and 26 have been withdrawn slightly.

The machine, as shown and described, operates very rapidly and will bag a tire in a very short space of time. While the mechanism has been very particularly described, it will be understood that changes and modifications may be made within the scope thereof as set forth in the claims. The fact that the machine is vertical assists in the rapid operation of the machine. While the machine is described for the purpose of inserting air bags, it will be understood that other similar bodies may be collapsed thereon.

What is claimed is:

1. A machine for the uses and purposes set forth, comprising a plurality of arms radiating from the center of the machine, shoes upon certain of the arms for engaging the inner periphery of a collapsible ring-shaped body, shoes upon the other arms for engaging the outer periphery of the body, and means for moving the last named shoes relatively to the plane of the body and toward and from the center of the machine.

2. A machine for the uses and purposes set forth, comprising a support for the inner periphery of an air bag, a plurality of shoes movable toward and away from the center of the bag and adapted to engage the outer periphery thereof, and means to move the shoes relatively to the plane of the air bag.

3. A machine for the uses and purposes set forth, comprising a support for the inner periphery of an air bag, a plurality of guide bars radiating from the center of the bag, a slide upon each bar, a pivoted shoe upon the slide, and means for moving the slides toward and from the center of the bag.

4. A machine for the uses and purposes set forth, comprising a support for the inner periphery of an air bag, a plurality of guide bars radiating from the center of the bag, a slide upon each bar, a pivoted shoe upon the slide, means for moving the slides toward and from the center of the bag, and means for rocking the shoes upon the slides.

5. A machine for the uses and purposes set forth, comprising a support for the inner periphery of an air bag, a plurality of guide bars radiating from the center of the bag, a slide upon each bar, a pivoted shoe upon the slide, and means for moving the slides toward and from the center of the bag comprising a single chain paralleling the various arms and attached to the slides.

6. A machine for the uses and purposes set forth, comprising a support for the inner periphery of an air bag, a plurality of guide bars radiating from the center of the bag, a slide upon each bar, a pivoted shoe upon the slide, and an air cylinder upon the slide connected with the shoe and adapted to rock it into and out of the plane of the bag.

7. A machine for the uses and purposes set forth, comprising a support for the inner periphery of an air bag, a plurality of guide bars radiating from the center of the bag, a slide upon each bar, a pivoted shoe upon the slide, a toggle mechanism connected to the shoe, and means to operate the toggle to move the shoe into and out of the plane of the bag.

8. A machine for the uses and purposes set forth, comprising a support for the inner periphery of an air bag, a plurality of guide bars radiating from the center of the bag, a slide upon each bar, a pivoted shoe upon the slide, a toggle mechanism connected to the shoe, and an air cylinder to operate the toggle to move the shoe into and out of the plane of the bag.

9. A machine for the uses and purposes set forth, comprising six shoes arranged in groups of three, one group engaging the inner periphery of the bag and the other group the outer periphery of the bag, and means to move the second group toward and from the center of the bag and relatively to the plane of the bag.

10. A machine for the uses and purposes set forth, comprising six shoes arranged in groups of three, one group engaging the inner periphery of the bag and the other group the outer periphery of the bag, and means to move the second group toward and from the center of the bag and relatively to the plane of the bag, the shoes of one group alternating with the shoes of the other group about the bag.

11. In a machine for the insertion of air bags or the like into pneumatic tires, a plurality of shoes arranged in groups to engage the inner and outer peripheries of the air bag respectively, means to move the outer group toward and from the center of the bag, and means to move the inner group independently of the outer group.

12. In a machine for the insertion of air bags or the like in pneumatic tires, a plurality of shoes spaced about the inner periphery of the air bag and forming a support therefor, means engaging the outer periphery of the bag and adapted to distort it between the shoes, and mechanism adapted to move a shoe outwardly after the bag is inserted to position it within the tire.

13. In a machine for the uses and purposes set forth, the combination of means for supporting an air bag at a plurality of spaced points, collapsing mechanism for distorting the air bag to such condition that it may be placed within a tire, and a nozzle for admitting air to the interior of the bag, together with means for tamping the inner periphery of the bag.

14. In a machine for the uses and purposes set forth, the combination of means for distorting an air bag into such position that it can be placed within a tire, means to release the bag so that it may expand into the tire, tamping shoes engaging the inner periphery of the air bag, and means for reciprocating the shoes.

15. In a machine for the uses and purposes set forth, a vertical framework, a plurality of arms radiating from the center of the framework, slides movable over the arms, shoes upon the slides, half of said shoes engaging the inner periphery of an air bag, the other half of said shoes engaging the outer periphery of the air bag, means to move the outer shoes in unison toward and from the center of the machine, and means for withdrawing them from the plane of the bag.

16. In a machine for the uses and purposes set forth, a vertical framework, a plurality of arms radiating from the center of the framework, slides movable over the arms, shoes upon the slides, half of said shoes engaging the inner periphery of an air bag, the other half of said shoes engaging the outer periphery of the air bag, means to move the outer shoes in unison toward and from the center of the machine, means for withdrawing them from the plane of the bag, and independent means for moving certain of the inner shoes toward and from the center of the bag.

17. In a machine for the uses and purposes set forth, a vertical framework, a plurality of arms radiating from the center of the framework, slides movable over the arms, shoes upon the slides, half of said shoes engaging the inner periphery of an air bag, the other half of said shoes engaging the outer periphery of the air bag, means to move the outer shoes in unison toward and from the center of the machine, means for withdrawing them from the plane of the bag, and means for admitting air under pressure to the interior of the bag.

18. In a machine for the uses and purposes set forth, a vertical framework, a plurality of arms radiating from the center of the framework, slides movable over the arms, shoes upon the slides, half of said shoes engaging the inner periphery of an air bag, the other half of said shoes engaging the outer periphery of the air bag, means to move the outer shoes in unison toward and from the center of the machine, means for withdrawing them from the plane of the bag, independent means for moving certain of the inner shoes toward and from the center of the bag, and means for admitting air under pressure to the interior of the bag.

19. In a machine for the uses and purposes set forth, a vertical framework, a plurality of arms radiating from the center of the framework, slides movable over the arms, shoes upon the slides, certain of said shoes engaging the inner periphery of the air bag, the other shoes engaging the outer periphery of the bag, means to move the slides carrying the shoes in unison toward and away from the center of the machine, the outer shoes being pivoted upon the slides, and mechanism to rock the shoes upon their pivots in unison.

20. In a machine for the uses and purposes set forth, a vertical framework, a plurality of arms radiating from the center of the framework, slides movable over the arms, shoes upon the slides, certain of said shoes engaging the inner periphery of the air bag, the other shoes engaging the outer periphery of the bag, means to move the slides carrying the shoes in unison toward and away from the center of the machine, the outer shoes being pivoted upon the slides, mechanism to rock the shoes upon their pivots in unison, and independent means to move slides carrying inner shoes toward and from the center of the bag.

21. In a machine for the uses and purposes set forth, a vertical framework, a plurality of arms radiating from the center of the framework, slides movable over the arms, shoes upon the slides, certain of said shoes engaging the inner periphery of the air bag, the other shoes engaging the outer periphery of the bag, means to move the slides carrying the shoes in unison toward and away from the center of the machine, the outer shoes being pivoted upon the slides, mechanism to rock the shoes upon their pivots in unison, independent means to move slides carrying inner shoes toward and from the center of the bag, and means to admit fluid under pressure to the interior of the bag.

CLARENCE W. HOWLETT.